United States Patent
Watanabe et al.

(10) Patent No.: US 8,213,113 B2
(45) Date of Patent: Jul. 3, 2012

(54) DISK DRIVE DEVICE WITH VIBRATION REDUCTION OF SECOND ORDER ROCKING-MODE RESONANCE

(75) Inventors: Takanori Watanabe, Shizuoka (JP); Hiroshi Iwai, Shizuoka (JP); Isamu Hashimoto, Shizuoka (JP)

(73) Assignee: Alphana Technology Co. Ltd., Fujieda-shi, Shizuoka (JP)

( * ) Notice: Subject to any disclaimer, the term of this patent is extended or adjusted under 35 U.S.C. 154(b) by 379 days.

(21) Appl. No.: 12/572,020

(22) Filed: Oct. 1, 2009

(65) Prior Publication Data

US 2010/0202084 A1 Aug. 12, 2010

(30) Foreign Application Priority Data

Feb. 6, 2009 (JP) ................... 2009-026737

(51) Int. Cl.
*G11B 17/02* (2006.01)
*H02K 21/02* (2006.01)
(52) U.S. Cl. ................. 360/98.07; 360/99.08; 310/67 R
(58) Field of Classification Search ............. 360/98.07, 360/99.08; 310/67 R, 90
See application file for complete search history.

(56) References Cited

U.S. PATENT DOCUMENTS

| 6,594,107 | B2 * | 7/2003 | Hayakawa et al. | 360/97.01 |
| 2003/0099061 | A1 * | 5/2003 | Bahirat et al. | 360/99.08 |
| 2003/0192166 | A1 * | 10/2003 | Kelemen | 29/603.03 |
| 2006/0244326 | A1 * | 11/2006 | Tamaoka | 310/90 |
| 2009/0279818 | A1 * | 11/2009 | Le et al. | 384/112 |
| 2010/0202084 | A1 * | 8/2010 | Watanabe et al. | 360/99.08 |
| 2010/0226046 | A1 * | 9/2010 | Saito et al. | 360/245.2 |
| 2010/0238591 | A1 * | 9/2010 | Sano et al. | 360/224 |
| 2011/0051287 | A1 * | 3/2011 | Tokunaga | 360/133 |
| 2011/0116191 | A1 * | 5/2011 | Maeda et al. | 360/224 |

FOREIGN PATENT DOCUMENTS

| JP | 2007-080488 | 3/2007 |
| JP | 2007-213629 | 8/2007 |

* cited by examiner

*Primary Examiner* — Jefferson Evans
(74) *Attorney, Agent, or Firm* — Fulwider Patton LLP (57) ABSTRACT

In a brushless motor, the rotational frequency N (Hz) of the hub satisfies $N<F_0/(3*P+2)$, where $F_0$ (Hz) is an Eigen frequency of the second order rocking-mode resonance when not rotating in the situation where the recording disk is mounted on the hub. The recording disk is mounted on the hub. A base plate rotatably supports the hub. A laminated core is fixed to the base. The core has a ring portion and a plurality of teeth that extend radially from the ring portion. Coils are wound around the plurality of teeth. The coils are three-phase driven. A cylindrical magnet is fixed to the hub. The cylindrical magnet are magnetized for driving with P (P is a natural number) poles along the circumferential direction and are arranged to radially face the plurality of teeth.

20 Claims, 7 Drawing Sheets

RELATED ART

DISK DRIVE DEVICE WITH VIBRATION REDUCTION OF SECOND ORDER ROCKING-MODE RESONANCE

CROSS-REFERENCE TO RELATED APPLICATIONS

This application is based upon and claims the benefit of priority from the prior Japanese Patent Application No. 2009-026737, filed on Feb. 6, 2009, the entire contents of which are incorporated herein by reference.

FIELD OF THE INVENTION

The present invention relates to a disk drive device.

DESCRIPTION OF THE RELATED ART

A hard disk drive is know as a medium used as a storage device in a computer. In the hard disk drive, a magnetic recording disk on which recording tracks are formed is rotated with a high speed by a brushless motor. Such a brushless motor is disclosed in Japanese Patent Application Publication No. 2007-80488 and Japanese Patent Application Publication No. 2007-213629. A magnetic head is placed against the surface of the magnetic recording disk with a slight interval between them for the purpose of reading/writing magnetic data contained in the recording tracks.

SUMMARY OF THE INVENTION

One of the methods for increasing the storage capacity of the hard disk drive is to narrow the width of the recording track and to make the magnetic head closer to the surface of the magnetic recording disk. The narrow interval between the magnetic head and the surface of the magnetic recording disk may cause the magnetic head to touch the magnetic recording disk due to, for example, vibrations in the brushless motor. This may cause a malfunction of the hard disk drive. The narrowness of the width of the recording track may disturb the tracing of the recording track.

BACKGROUND OF THE INVENTION

The present invention addresses these disadvantages, and a general purpose thereof is to provide a disk drive device that reduces vibrations.

An embodiment of the present invention relates to a disk drive device. This disk drive device comprises: a hub on which a recording disk is to be mounted; a base rotatably supporting the hub through a bearing unit; a core fixed to the base, the core having a ring portion and a plurality of teeth that extend radially from the ring portion; coils wound around the plurality of teeth, the coils being three-phase driven; and a magnet fixed to the hub, the magnet being magnetized for driving with P (P is a natural number) poles along the circumferential direction and arranged to radially face the plurality of teeth. The hub has a convex portion of which the center is a rotational axis, and the convex portion is fit into the central hole of the recording disk. The rotational frequency N (Hz) of the hub satisfy $N<F_0/(3*P+2)$, where $F_0$ (Hz) is an Eigen frequency of the second order rocking-mode resonance when not rotating in the situation where the recording disk is mounted on the hub.

Another embodiment of the present invention also is a disk drive device. This disk drive device comprises: a hub on which a recording disk is to be mounted; a base rotatably supporting the hub through a bearing unit; a core fixed to the base, the core having a ring portion and a plurality of teeth that extend radially from the ring portion; coils wound around the plurality of teeth, the coils being three-phase driven; and a magnet fixed to the hub, the magnet being magnetized for driving with P (P is a natural number) poles along the circumferential direction and arranged to radially face the plurality of teeth. The hub has a convex portion of which the center is a rotational axis, and the convex portion is fit into the central hole of the recording disk. An Eigen frequency $F_0$ satisfy $F_0>N*(3*P+2)$, where $F_0$ (Hz) is an Eigen frequency of the second order rocking-mode resonance when not rotating in the situation where the recording disk is mounted on the hub, and N (Hz) is a rotational frequency of the hub.

Optional combinations of the aforementioned constituting elements, and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments and a related art. This does not intend to limit the scope of the present invention, but to exemplify the invention. The size of the component in each figure may be changed in order to aid understanding. Some of the components in each figure may be omitted if they are not important for the explanation.

Preferably, an embodiment of the present invention is used for a brushless motor that is installed in a hard disk drive and that drives a magnetic recording disk or a disk drive motor that is installed in an optical-disk drive device such as a CD device or a DVD device. A brushless motor according to the embodiment of the present invention is configured so that the frequency of the torque-ripple and the frequency of the second order rocking-mode resonance do not coincide when rotating. This may reduce the vibrations of the brushless motor and of the magnetic recording disk mounted on the brushless motor due to the second order rocking-mode resonance.

First, a concern recognized by the inventors of the present invention is explained by reference to the configuration of the brushless motor 700 according to a related art.

Figure 1:
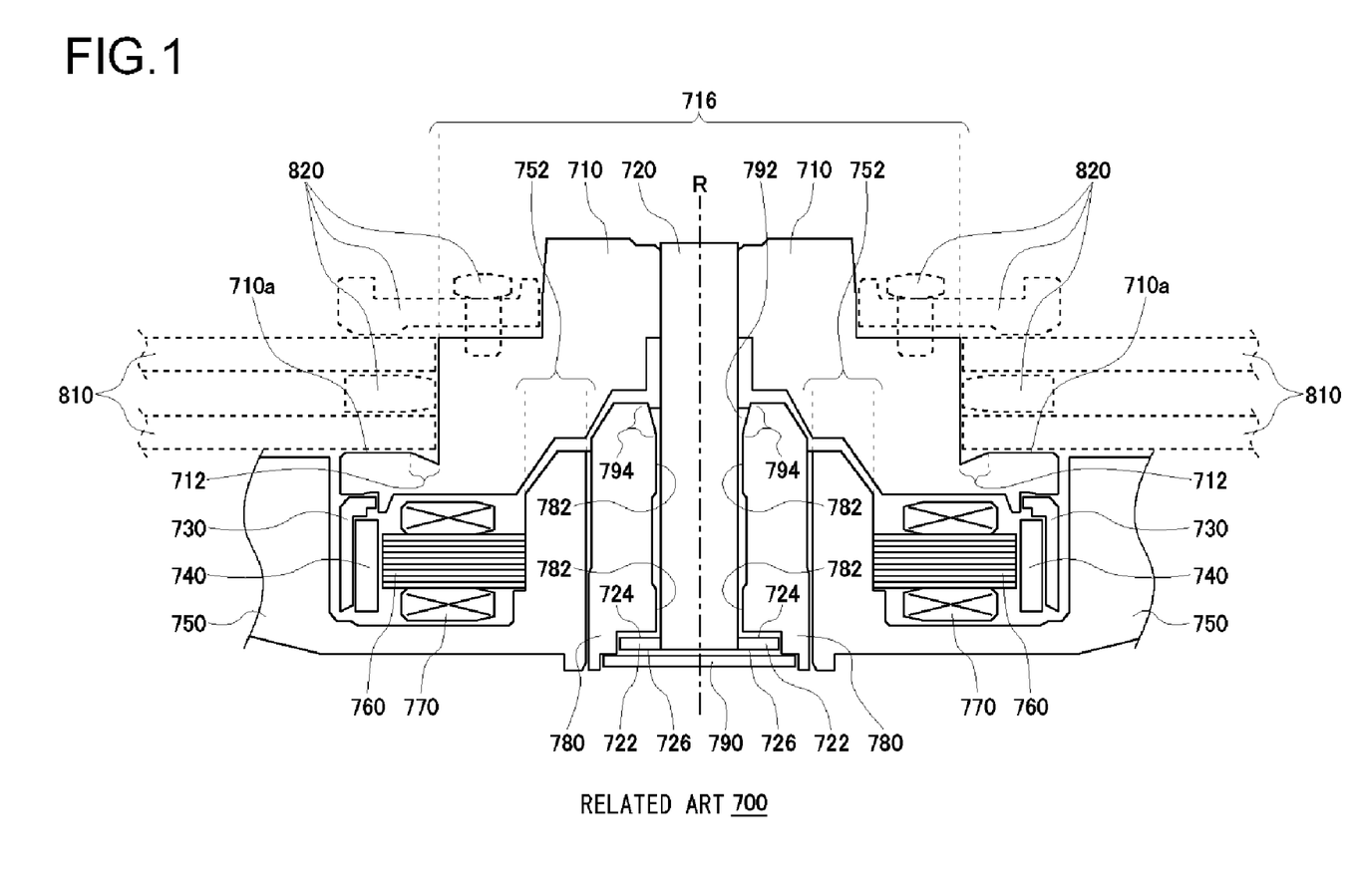
FIG. 1 is a cross section of a brushless motor according to a related art.

FIG. 1 is a cross section of a brushless motor 700 according to the related art. The brushless motor 700 is installed in a hard disk drive and rotates a magnetic recording disk 810. The brushless motor 700 comprises a hub 710, a shaft 720, a flange 722, a cylindrical yoke 730, a cylindrical magnet 740, a base plate 750, a laminated core 760, coils 770, a sleeve 780, a plate 790, and lubricant 792. Hereinafter, it is assumed that the side of the base plate 750 on which the hub 710 is installed is the "upper" side.

The hub 710, the shaft 720, the flange 722, the cylindrical yoke 730, and the cylindrical magnet 740 form a rotor, and these components rotate as a unit around the rotational axis R of the motor when the brushless motor 700 rotates. One end of the shaft 720 is press-fitted in a hole located at the center of the hub 710. The flange 722 is press-fitted to the other end of the shaft 720. The hub 710 has a convex portion 716 of which the center is the rotational axis R of the motor, and the convex portion 716 is fit into the central hole of the magnetic recording disk 810. The magnetic recording disk 810 is mounted on the hub 710 by a locking means 820 such as a screw, a spacer, or a clamp.

The cylindrical yoke 730 has a reverse L-shaped cross section and is made of a magnetic material such as iron. The cylindrical magnet 740 is glued on the inner surface of the cylindrical yoke 730. The cylindrical yoke 730 is glued on the lower surface of the hub 710. The cylindrical magnet 740 is made of a rare-earth material such as Neodymium, Iron, or Boron. The cylindrical magnet 740 faces radially towards twelve teeth of the laminated core 760. The cylindrical magnet 740 is magnetized for driving with P (P is a natural number) poles along the circumferential direction.

The base plate 750, the laminated core 760, the coils 770, the sleeve 780, and the plate 790 form a stator. The stator rotatably supports the rotor when the brushless motor 700 rotates. The base plate 750 is a part of the base of the hard disk drive. The base plate 750 has a cylindrical portion 752 of which the center is the rotational axis R of the motor. The sleeve 780 is glued on the inner surface of the cylindrical portion 752. The sleeve 780 accommodates the shaft 720. The plate 790 is glued on the flange 722 side surface of the sleeve 780, and the plate 790 works as a seal there.

The base plate 750 may be made separately from the base of the hard disk drive.

The lubricant 792 is injected in a region in between part of the rotor (the shaft 720 and the flange 722) and part of the stator (the sleeve 780 and the plate 790). The sleeve 780 and the plate 790 constitute a bearing unit that rotatably supports the rotor.

A pair of herringbone-shaped radial dynamic pressure grooves 782 that are vertically separated from each other are formed on the inner surface of the sleeve 780. A first herringbone-shaped thrust dynamic pressure groove 724 is formed on the upper surface of the flange 722. A second herringbone-shaped thrust dynamic pressure groove 726 is formed on the lower surface of the flange 722. The rotor is axially and radially supported by the dynamic pressure generated in the lubricant 792 by these dynamic pressure grooves when the brushless motor 700 rotates.

A capillary seal 794, where the gap between the inner surface of the sleeve 780 and the outer surface of the shaft 720 increases gradually upwardly, is formed on the opening side of the sleeve 780. The capillary seal 794 prevents the leakage of the lubricant 792 with the capillary effect.

The laminated core 760 has a ring portion and twelve teeth that extend out radially from the ring portion. The laminated core 760 is formed by laminating eight thin electro-magnetic steel plates and integrating them by laser welding. Each of the coils 770 is wound around one of the twelve teeth, respectively. A driving flux is generated along the teeth by applying an M-phase (M is a natural number) sinusoidal driving current through the coils 770. The inner surface of the ring portion of the laminated core 760 is fitted to the outer surface of the cylindrical portion 752 with clearance fit, and glued there.

The torque-ripple and the resonance frequency in the above-mentioned brushless motor 700 are explained below. It is assumed here that two magnetic recording disks 810 are mounted on the brushless motor 700.

First, with regard to the torque-ripple, in the brushless motor 700, the interaction between the magnetic field induced in the coils 770 and the magnetic poles of the cylindrical magnet 740 generates a driving torque. There is torque-ripple in this driving torque. The frequency (hereinafter referred to as a torque-ripple center frequency) of the basic wave of the torque-ripple is proportional to the rotational frequency N (Hz) of the brushless motor 700 and is described in the following Equation 1.

$$M*P*N(\text{Hz}) \qquad \text{(Equation 1)}$$

In reality, the interaction is not even in the sense that the driving torque applied to the rotor is not even during one rotation of the rotor. Therefore, the torque-ripple is modulated with the same frequency as the rotational frequency N (Hz). As a result, the torque-ripple includes frequency sideband components as shown in the following Equation 2.

$$M*P*N \pm N = (M*P \pm 1)*N(\text{Hz}) \qquad \text{(Equation 2)}$$

Hereinafter the torque-ripple center frequency M*P*N and its two sideband components (M*P±1)*N are considered. These three frequencies are denoted as torque-ripple frequencies.

Figure 2:
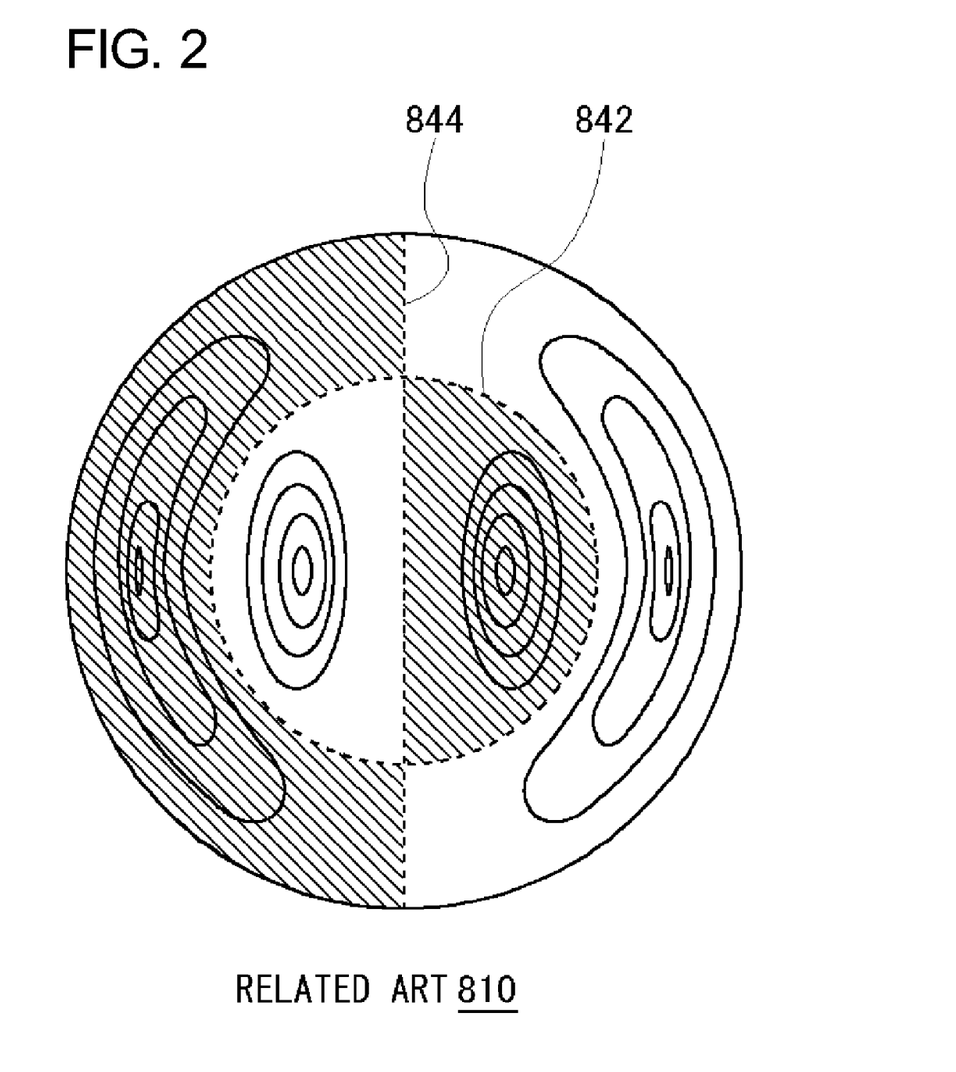
FIG. 2 is a schematic view that schematically shows the manner of the instantaneous vibration of the surface of a magnetic recording disk.

Second, the resonance is investigated. The inventors of the present invention investigate the resonance of the brushless motor 700 when not rotating in the situation where two magnetic recording disks 810, both with a 3.5-inch (88.9 mm) diameter, are mounted on the brushless motor 700. The following with regard to the vibrations of the magnetic recording disks 810 is a result of the investigation:

FIG. 2 is a schematic view that schematically shows the instantaneous vibration manner of the surface of a magnetic recording disk 810. In FIG. 2, dashed lines denote both a nodal diameter 844 and the nodal circle 842 in proximity to the torque-ripple frequencies, and the phase of the vibration in proximity to the torque-ripple frequencies in a region with hatching is opposite to that of a region without hatching, and solid lines show the contour lines of vibration displacements in proximity to the torque-ripple frequencies.

As shown in FIG. 2, the so-called second order rocking-mode resonance (hereinafter referred to as a second order rocking-mode resonance,) that includes one nodal diameter 844 and a nodal circle 842, is observed in proximity to the torque-ripple frequencies.

According to research by the inventors of the present invention, the main elements that determine the Eigen frequency $F_0$ (hereinafter referred to as the Eigen frequency $F_0$) of the second order rocking-mode resonance when not rotating are the stiffness of the bearing, the strength of the connecting portion between the hub 710 and the shaft 720, the strength of the connecting portion between the magnetic recording disk 810 and the hub 710, the stiffness of the magnetic recording disk 810 itself, the transverse moment of inertia of the magnetic recording disk 810, and the transverse moment of inertia of the hub 710.

According to the inventors of the present invention, the frequency of the second order rocking-mode resonance splits along the rotational direction and against the rotational direction due to the gyro effect as the rotational frequency N (Hz) increases in the case where the magnetic recording disk 810 mounted in the brushless motor 700 rotates. In particular, the amount of the split is ±N (Hz) in the case where the magnetic recording disk 810 rotates with the rotational frequency N (Hz), and two split frequencies of the second order rocking-mode resonance are $F_0 \pm N$ (Hz). Therefore, these two split frequencies $F_0 \pm N$ (Hz) are matters of interest when it comes to the second order rocking-mode resonance.

The magnetic recording disk 810 vibrates a lot due to resonance if one of the three torque-ripple frequencies described above coincides with either one of the two split frequencies of the resonance. This large vibration may cause the disturbance of the tracing of the recording track and may worsen the error rate of read/write of data, thereby may make it difficult to make the brushless motor 700 have a higher density and a larger capacity.

With regard to the coincidence of the frequencies, the configuration of the brushless motor 700 is reviewed by reference to FIG. 1. It should be noted that an axial concave portion 712 that caves in the axial direction is formed on a disk-mounted surface 710*a* of the hub 710 on which the magnetic recording disk 810 hits. Since the magnetic recording disk 810 is pressed against the disk-mounted surface 710*a* on which this axial concave portion 712 is formed, the strength of the connection between the magnetic recording disk 810 and the hub 710 may differ from case to case depending on the shape of the axial concave portion 712. This may cause the dispersion of the Eigen frequency $F_0$ of the brushless motor 700. Depending on the situation, one of the three torque-ripple frequencies may coincide with either one of the two split frequencies of the resonance, and thereby large vibrations may be induced.

The axial concave portion 712 is formed during the manufacturing process of the hub 710 according to the related art.

Figure 3:
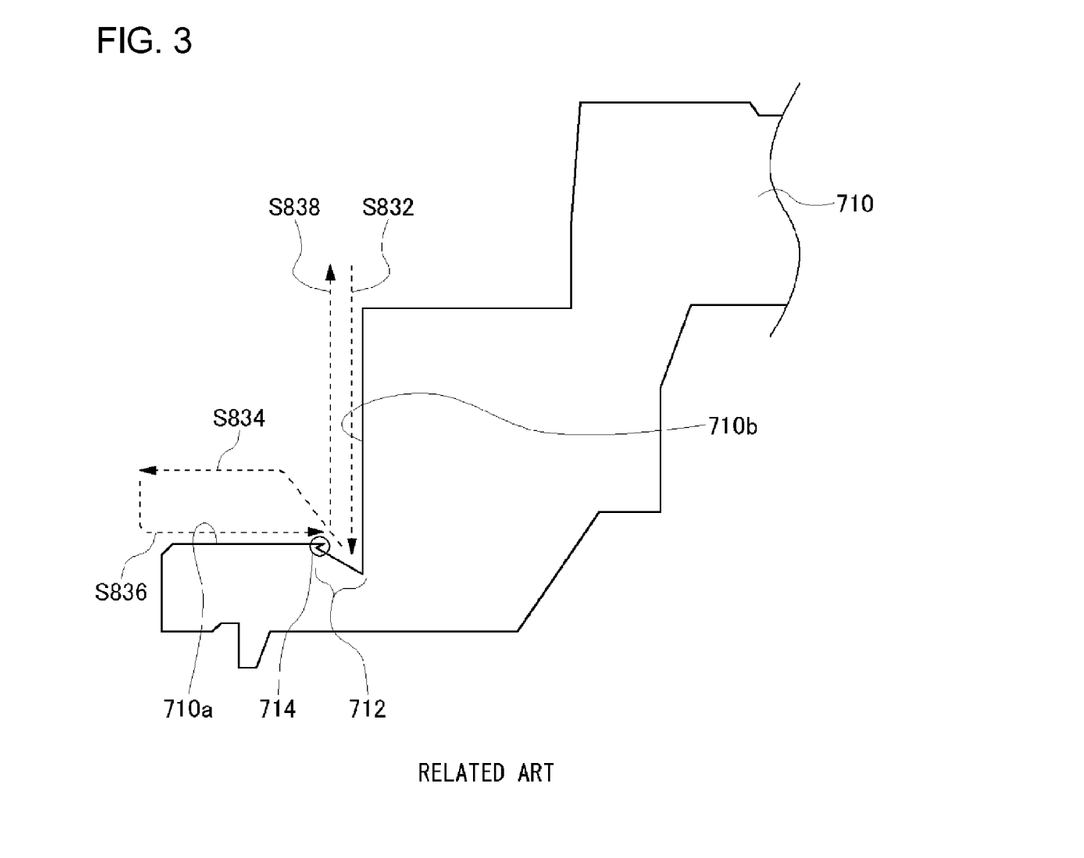
FIG. 3 is a schematic view that shows procedures for forming the hub by cutting according to the related art.

FIG. 3 is a schematic view that shows procedures for forming the hub 710 by cutting according to the related art. In FIG. 3, solid lines show the section of the hub 710, and the dashed arrows show the trajectories along which the tip of a machining tool, such as a tool bit, moves.

One chucks the hub to be cut to the lathe and rotates the hub. One forms an outer-cylindrical surface 710*b* of the hub by cutting downward (S832). One moves the machining tool away from the hub and moves it towards the outside in the radial direction (S834). One forms the disk-mounted surface 710*a* by cutting from outside to inside in the radial direction (S836). One moves the machining tool away from the hub 710 and moves it upward (S838).

As shown above, the axial concave portion 712 is formed during the transition from the step S832 to the step S834. Therefore, as long as one adopts the manufacturing process of the hub 710 according to the related art, the hub 710 has the axial concave portion 712, and there remains the concern of the dispersion of the Eigen frequency $F_0$ as described above.

Furthermore, in the step S836, a fine fin 714 may remain at the portion where the machining tool finishes cutting and is moved away. If this fine fin 714 is sandwiched in between the disk-mounted surface 710*a* and the magnetic recording disk 810, the Eigen frequency $F_0$ may scatter.

The inventors of the present invention proposes that the above concern of the brushless motor 700 according to the related art can be settled by adopting a brushless motor according to the first embodiment of the present invention. It is assumed here that two magnetic recording disks 810 are mounted on the brushless motor according to the first embodiment of the present invention.

First, assume that the Eigen frequency $F_0$ of the second order rocking-mode when not rotating is given for the brushless motor according to the first embodiment of the present invention. In order to avoid the situation where the one of the three torque-ripple frequencies coincides with either one of the two split frequencies of the resonance, the rotational frequency N (Hz) should satisfy the following condition (Equation 3) when M=3 (three-phase driving):

$$N<F_0/(3*P+2)(\text{Hz}) \qquad \text{(Equation 3)}$$

By way of example, the parameters that may be adopted for the brushless motor according to the first embodiment of the present invention are: the diameter of the mounted magnetic recording disk being 3.5 inches (88.9 mm): the number of magnetic poles of the magnet being 8 (P=8); and the Eigen frequency $F_0$ being 2600 Hz. In this case, the upper limit of the rotational frequency N (Hz) of the motor is determined to be 100 Hz (6000 $\text{min}^{-1}$). In reality, it is preferred that the rotational frequency is set to be 5400 $\text{min}^{-1}$, which is less than the upper limit, in light of the unevenness in manufacture. By adopting the rotational frequency that satisfies Equation 3, the situation where the torque-ripple frequencies coincide with the two split frequencies of the resonance can be avoided. As a result, large vibration due to the second order rocking-mode resonance can be reduced.

It may not be ideal to make the rotational frequency N (Hz) less than $F_0/(6*P)$ since the read/write of the hard disk drive in which the brushless motor is installed may be slowed.

Second, assume that the rotational frequency N (Hz) is given for the brushless motor according to the first embodiment of the present invention. The brushless motor according to the first embodiment of the present invention is configured so that the Eigen frequency $F_0$ of the second order rocking-mode resonance satisfies the following condition (Equation 4) by, for example, adjusting the shape of the mounted magnetic recording disk, the hub, or the base plate:

$$F_0>(3*P+2)*N(\text{Hz}) \qquad \text{(Equation 4)}$$

With regard to the brushless motor according to the first embodiment of the present invention, the strength of the connecting portion between the magnetic recording disk and the hub may be strengthened in order to adjust the Eigen frequency $F_0$. Alternatively, the hub may be configured so that the transverse moment of inertia of the hub is reduced. By configuring the brushless motor according to the first embodiment of the present invention so that the Eigen frequency $F_0$ satisfies Equation 4, the situation where the torque-ripple frequencies coincide with the two split frequencies of the resonance can be avoided. As a result, a large vibration due to the second order rocking-mode resonance can be reduced.

It may be possible that the condition above (Equation 3) is not satisfied because of the change in the resonant frequency caused by the change in temperature. To cope with this, it is possible to configure the brushless motor so that it satisfies the condition $N<F_0/(3*P+3)$, in light of some margin. This case is preferred since it is likely to satisfy the condition (Equation 3) even if the temperature changes.

A brushless motor 100 according to the second embodiment of the present invention is described below. The brushless motor 100 is configured so that the Eigen frequency $F_0$ satisfies Equation 4 in the case where N=90 (Hz). Hereinafter the differences between the brushless motor 100 according to the second embodiment of the present invention and the brushless motor 700 according to the related art are described, and similar explanations will not be repeated, depending on the case.

It may be possible that the condition above (Equation 4) is not satisfied because of the change in the resonant frequency caused by the change in temperature. To cope with this, it is possible to configure the brushless motor so that it satisfies the condition $F_0>N*(3*P+3)$, in light of some margin. This case is preferred since it is likely to satisfy the condition (Equation 4) even if the temperature changes.

Figure 4:
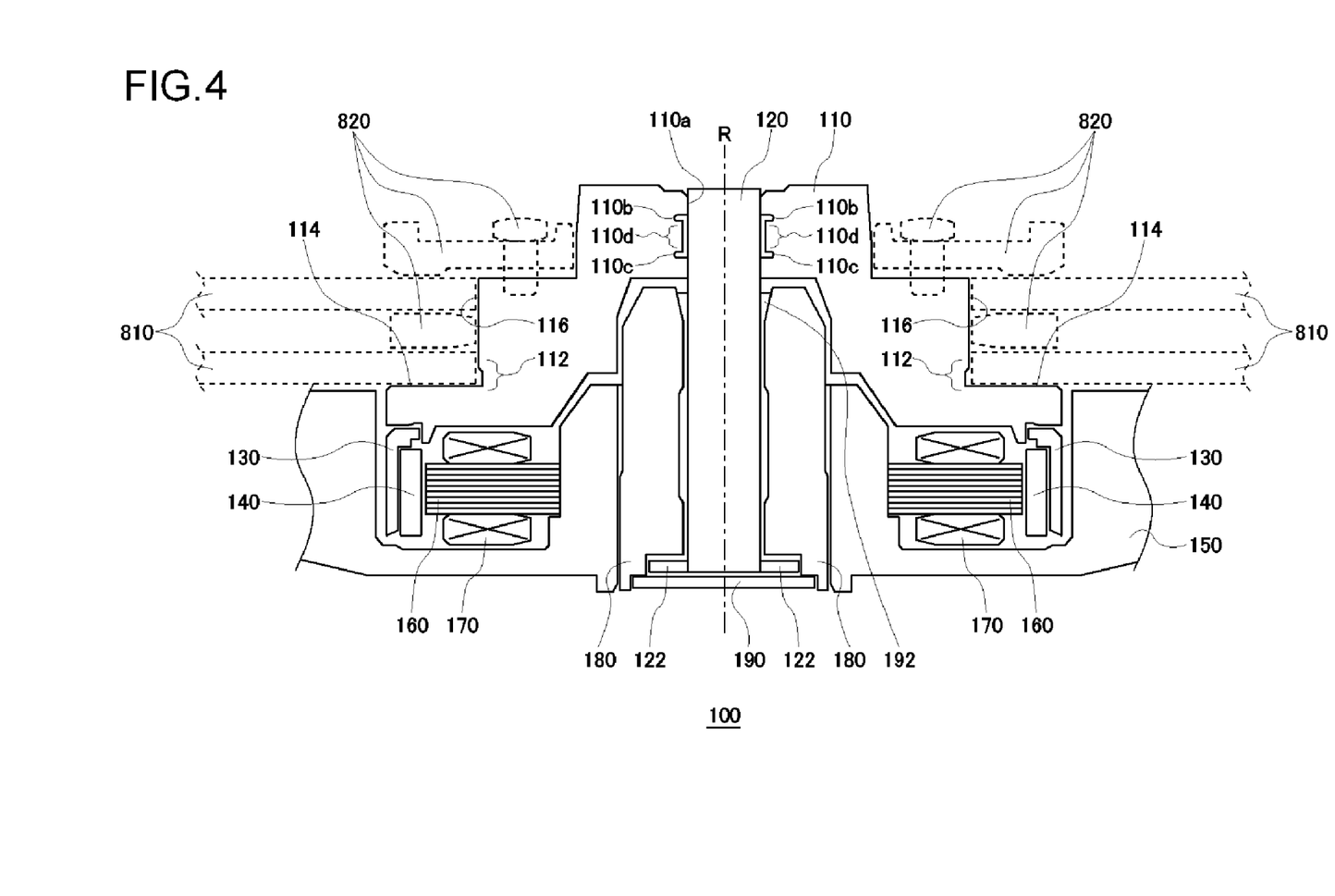
FIG. 4 is a cross section of a brushless motor according to the second embodiment of the present invention.

FIG. 4 is a cross section of a brushless motor 100 according to the second embodiment of the present invention. The brushless motor 100 comprises a hub 110, a shaft 120, a flange 122, a cylindrical yoke 130, a cylindrical magnet 140, a base plate 150, a laminated core 160, coils 170, a sleeve 180, a plate 190, and lubricant 192. The laminated core 160 has twelve teeth. Each of the coils 170 is wound around one of the twelve teeth, respectively. A three-phase (M=3) sinusoidal driving current flows through the coils 170.

The hub 110 is made of a metal, such as Aluminum or Iron. A ring-shaped first groove 110b and a ring-shaped second groove 110c are formed on the inner surface 110a of the hole arranged in the center of the hub 110. The first groove 110b and the second groove 110c are made in order to store glue. The first groove 110b is separated from the second groove 110c in the axial direction. It is preferred that both the depth of the first groove 110b and the depth of the second groove 110c are in between 10~50 μm. In particular, both are set to be 25 μm. The diameter of the inner surface 110d sandwiched between the first groove 110b and the second groove 110c is set to be larger than the diameter of the inner surface of the upper side of the first groove 110b by 5~30 in particular, 12 μm. According to this configuration of the first groove 110b, the second groove 110c, and the inner surface 110d sandwiched between them, the first groove 110b, the second groove 110c, and the inner surface 110d sandwiched between them may not apply any stress to the shaft 120 while mounting the hub 110 to the shaft 120. As a result, the hub 110 may be mounted to the shaft 120 accurately.

The hub 110 may be formed by die-forging or machining a conductive resin.

The axial concave portion that caves in the axial direction as in the case of the related art is not formed on the disk-mounted surface 114 of the hub 110 on which the magnetic recording disk 810 hits. Instead, the disk-mounted surface 114 is made flat. As a result, the dispersion of the Eigen frequency $F_0$ due to the dispersion of the shape of the axial concave portion can be suppressed. Furthermore, by making the disk-mounted surface 114 flat, the magnetic recording disk 810 can be fixed more tightly to the hub 110; the Eigen frequency $F_0$ can thereby be increased. The manufacturing process of the hub 110 is described later.

A ring-shaped radial concave portion 112 that caves in the radial direction is formed on the outer surface 116 of the hub 110 to which the central hole of the magnetic recording disk 810 fits. A chamfer 118 is formed at the outside end in the radial direction of the disk-mounted surface 114. Details are described later.

The cylindrical magnet 140 is magnetized for driving with 8 poles (P=8) along the circumferential direction.

The manufacturing process of the hub 110 is described below.

Figure 5:
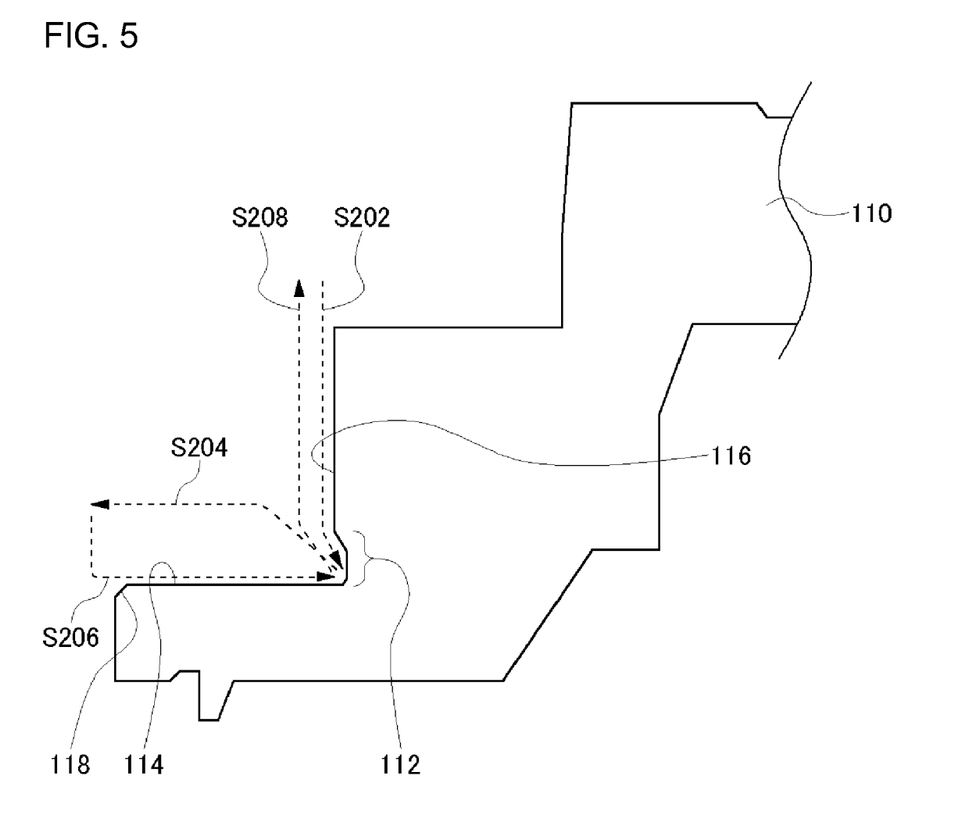
FIG. 5 is a schematic view that shows procedures for forming the hub in FIG. 4 by cutting.

FIG. 5 is a schematic view that shows procedures for forming the hub 110 in FIG. 4 by cutting. In FIG. 5, solid lines show the section of the hub 110, and the dashed arrows show the trajectories along which the tip of a machining tool, such as a tool bit, moves.

One chucks the hub to be cut to the lathe and rotates the hub. One forms the outer surface 116 of the hub 110 by cutting downward. When finishing cutting, one forms the radial concave portion 112 by moving the machining tool inward in the radial direction (S202). One moves the machining tool away from the hub and moves it towards the outside in the radial direction (S204). One forms the disk-mounted surface 114 by cutting from outside to inside in the radial direction. Here, cutting is performed so that the machining tool reaches the inside of the radial concave portion 112 (S206). One moves the machining tool away from the outer surface 116 of the hub 110 and moves it upward (S208).

With regard to the size of the radial concave portion 112, it is preferred that the depth in the radial direction is set to be more than 0.1 mm. This is because, if one makes the depth in the radial direction small, R of the tip of the tool bit is reduced, and the tool bit may be worn out rapidly. On the other hand, it is preferred that the depth in the radial direction is set to be less than 0.3 mm. This is because, if one makes the depth in the radial direction more than 0.3 mm, it is likely that the stiffness of the hub 110 to decrease below the required level. With regard to the length in the axial direction, it is preferred that the length in the axial direction is set to be between 0.3 mm and 1.0 mm. Setting the length to be greater than or equal to 0.3 mm is for suppressing the wear-out of the tool bit. Setting the length to be less than or equal to 1.0 mm is for avoiding the worsening of the accuracy of the mounting of the magnetic recording disk 810.

The measurements from a vibration generator and a contactless displacement meter revealed that the Eigen frequency $F_0$ of the brushless motor 100 according to the present embodiment is 2430 Hz. In the present embodiment, Equation 4 is:

$$F_0>(3*8+2)*90(Hz)=2340(Hz).$$

Therefore, the Eigen frequency $F_0$=2430 (Hz) of the brushless motor 100 satisfies Equation 4. As a result, the situation where the torque-ripple frequencies coincide with the two split-frequencies of the resonance can be avoided; thereby large vibration due to the second order rocking-mode resonance can be reduced.

Furthermore, since the Eigen frequency $F_0$=2430 (Hz) has a margin with respect to the lower limit (2340 Hz) given by Equation 4, unevenness in manufacture of the brushless motor can be coped with.

In the brushless motor 100 according to the present embodiment, after one moves the machining tool towards the outside in the radial direction (S204), one forms the disk-mounted surface 114 by cutting from outside to inside in the radial direction. Therefore, the harmful influence due to the backlash of the moving part of the lathe affecting the accuracy can be reduced. As a result, the accuracy of the disk-mounted surface 114, such as the accuracy of the flatness, can be highly maintained.

In the brushless motor 100 according to the present embodiment, the chamfer 118 is formed. If the outside end in the radial direction of the disk-mounted surface 114 unintentionally warps or swells upward, the accuracy when mounting the magnetic recording disk 810 may be deteriorated. However, due to the chamfer 118, such deterioration of the accuracy when mounting the magnetic recording disk 810 can be prevented.

This configuration of the chamfer 118 is preferred with regard to the step S206 in which one forms the disk-mounted surface 114 by cutting from outside to inside in the radial direction. As to the disk-mounted surface 114, even if one aims to obtain a disk-mounted surface 114 that is perfectly perpendicular to the rotational axis R of the motor, some of the motors may have a fine taper or tilt due to the unevenness of the process. If the taper is such that the outer-diameter side of the disk-mounted surface 114 is away from the magnetic recording disk 810, the Eigen frequency $F_0$ of the second order rocking-mode resonance may decrease since the degree of contact between the disk-mounted surface 114 and the magnetic recording disk 810 may decrease, or the magnetic recording disk 810 may be mounted on a tilt. On the contrary, if the taper is such that the inner-diameter side of the disk-mounted surface 114 is away from the magnetic recording disk 810, the tilt of the magnetic recording disk 810 may be suppressed as long as the magnetic recording disk 810 makes close contact with the hub 110 by elastic deformation when mounting. This case is preferable since it is less likely for the Eigen frequency $F_0$ of the second order rocking-mode resonance to decrease.

In the present embodiment, one aims at obtaining a fine taper so that the inner-diameter side of the disk-mounted surface 114 is +1 μm with respect to the outer-diameter side, where the direction along which the distance from the magnetic recording disk 810 increases is defined to be positive. The taper is set to be in between −1 μm and +3 μm. If the taper is less than −3 μm, the Eigen frequency $F_0$ of the second order rocking-mode resonance may decrease, which is not preferable. If the taper is more than +10 the magnetic recording disk 810 may deform to create warpage on the recording surface, which is not preferable.

In the brushless motor 100 according to the present embodiment, cutting is performed so that the machining tool reaches the inside of the radial concave portion 112 (S206). Therefore, even if a fine fin is generated at the end of cutting, it remains inside of the radial concave portion 112 and does not affect the connection between the magnetic recording disk 810 and the hub 110.

A brushless motor 300 according to the third embodiment of the present invention is described below. The brushless motor 300 is configured so that its Eigen frequency $F_0$ satisfies Equation 4. Hereinafter, mainly the differences between the brushless motor 300 according to the third embodiment of the present invention and the brushless motor 700 according to the related art are described, and similar explanations will not be repeated, depending on the case.

Figure 6:
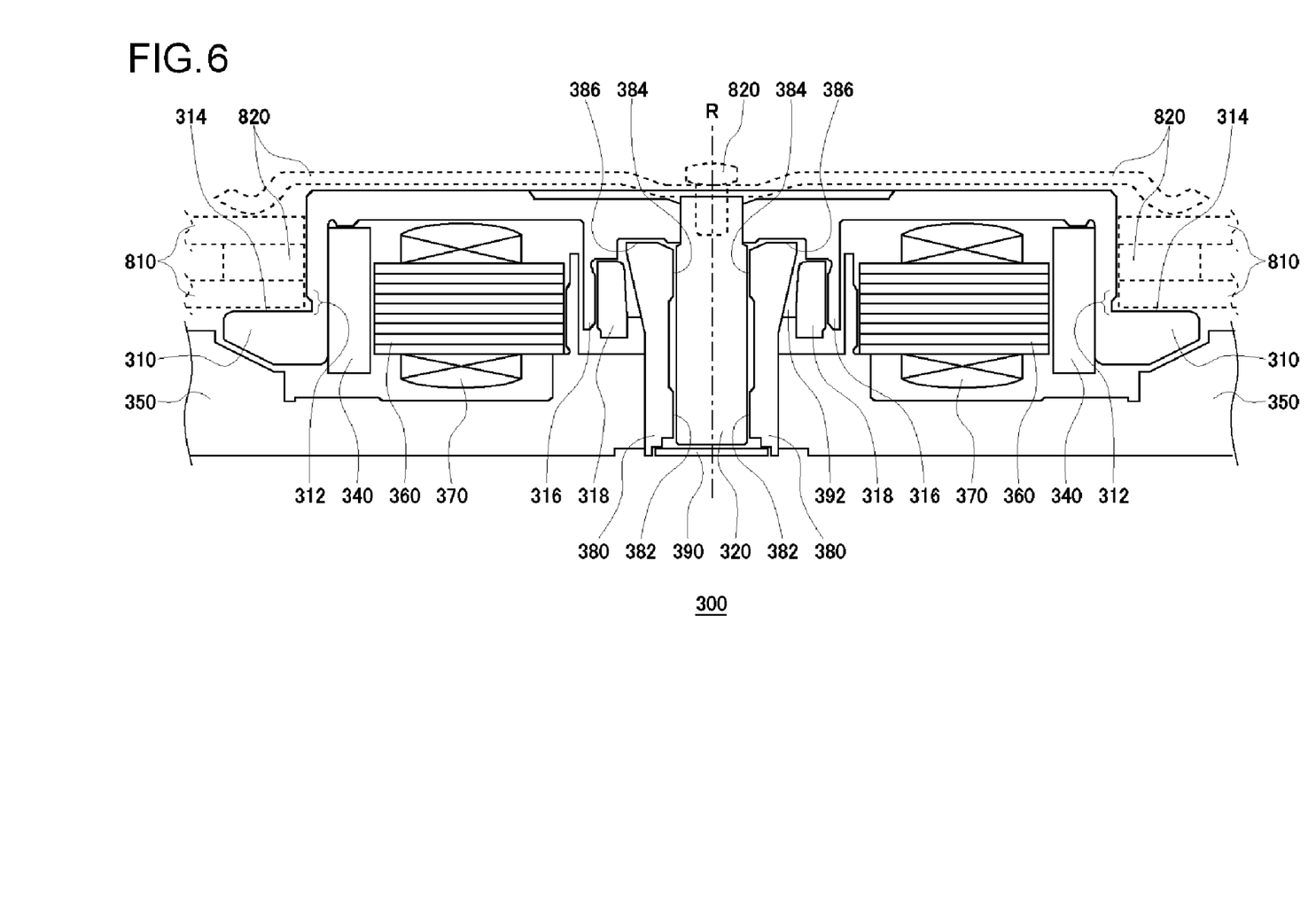
FIG. 6 is a cross section of a brushless motor according to the third embodiment of the present invention.

FIG. 6 is a cross section of a brushless motor 300 according to the third embodiment of the present invention. The brushless motor 300 comprises a hub 310, a thrust ring 318, a shaft 120, a cylindrical magnet 340, a base plate 350, a laminated core 360, coils 370, a sleeve 380, a plate 390, and lubricant 392. A magnetic recording disk 810 is mounted on the brushless motor 300 by a locking means 820. The hub 310 has a radial concave portion 312. The hub 310 has a cylindrical hanging portion 316 that has a hanging-shape from the lower surface of the hub 310. The thrust ring 318 is fixed on the inner surface of the hanging portion 316.

A pair of herringbone-shaped radial dynamic pressure grooves 382 and 384, which are separated from each other, are formed on the inner surface of the sleeve 380. The lower one of the radial dynamic pressure grooves is referred to as a first radial dynamic pressure groove 382, and the upper one is referred to as a second radial dynamic pressure groove 384. A herringbone-shaped thrust dynamic pressure groove 386 is formed on the upper end of the sleeve 380.

The second radial dynamic pressure groove 384 and the thrust dynamic pressure groove 386 are located above the disk-mounted surface 314 of the hub 310 in the axial direction. This configuration contributes to the stable support of the hub 310. Therefore, the Eigen frequency $F_0$ is increased so that it satisfies Equation 4. As a result, the situation where the torque-ripple frequencies coincide with the two split frequencies of the resonance can be avoided; a large vibration due to the second order rocking-mode resonance can thereby be reduced.

In the brushless motor 300 according to the present embodiment, there are advantages similar to those obtained for the brushless motor 100 according to the second embodiment of the present invention.

Figure 7:
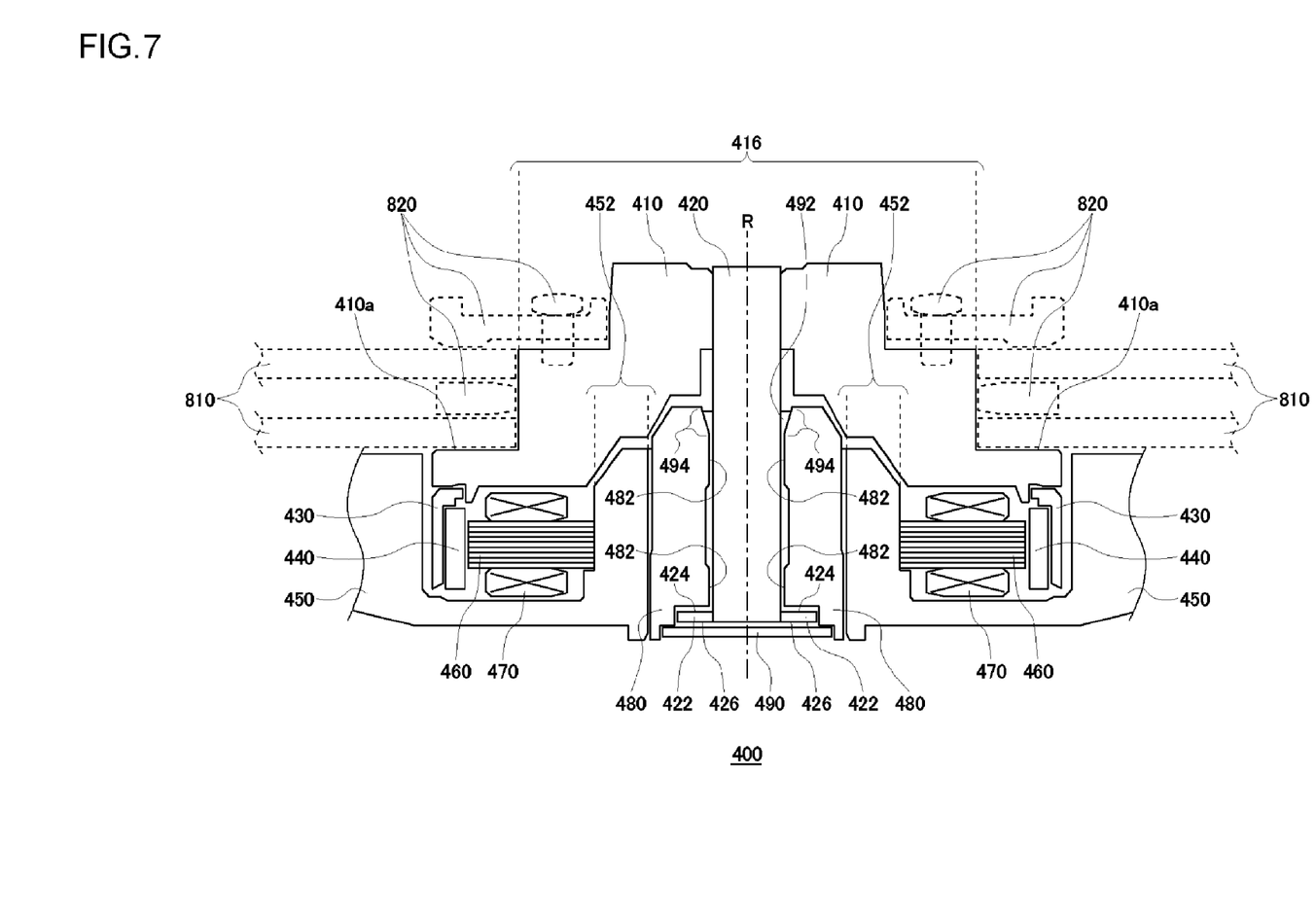
FIG. 7 is a cross section of a brushless motor according to the first embodiment of the present invention.

FIG. 7 is a cross section of a brushless motor 400 according to the first embodiment of the present invention. The brushless motor 400 is installed in a hard disk drive and rotates a magnetic recording disk 810. The brushless motor 400 comprises a hub 410, a shaft 420, a flange 422, a cylindrical yoke 430, a cylindrical magnet 440, a base plate 450, a laminated core 460, coils 470, a sleeve 480, a plate 490, and lubricant 492. Hereinafter, it is assumed that the side of the base plate 450 on which the hub 410 is installed is the "upper" side.

The hub 410, the shaft 420, the flange 422, the cylindrical yoke 430, and the cylindrical magnet 440 form a rotor, and these components rotate as a unit around the rotational axis R of the motor when the brushless motor 400 rotates. One end of the shaft 420 is press-fitted in a hole located at the center of the hub 410. The flange 422 is press-fitted to the other end of the shaft 420. The hub 410 has a convex portion 416 of which the center is the rotational axis R of the motor, and the convex portion 416 is fit into the central hole of the magnetic recording disk 810. The magnetic recording disk 810 is mounted on the hub 410 by a locking means 820 such as a screw, a spacer, or a clamp.

The cylindrical yoke 430 has a reverse L-shaped cross section and is made of a magnetic material such as iron. The cylindrical magnet 440 is glued on the inner surface of the cylindrical yoke 430. The cylindrical yoke 430 is glued on the lower surface of the hub 410. The cylindrical magnet 440 is made of a rare-earth material such as Neodymium, Iron, or Boron. The cylindrical magnet 440 faces radially towards twelve teeth of the laminated core 460. The cylindrical magnet 440 is magnetized for driving with P (P is a natural number) poles along the circumferential direction.

The base plate 450, the laminated core 460, the coils 470, the sleeve 480, and the plate 490 form a stator. The stator rotatably supports the rotor when the brushless motor 400 rotates. The base plate 450 is a part of the base of the hard disk drive. The base plate 450 has a cylindrical portion 452 of which the center is the rotational axis R of the motor. The sleeve 480 is glued on the inner surface of the cylindrical portion 452. The sleeve 480 accommodates the shaft 420. The plate 490 is glued on the flange 422 side surface of the sleeve 480, and the plate 490 works as a seal there.

The base plate 450 may be made separately from the base of the hard disk drive.

The lubricant 492 is injected in a region in between part of the rotor (the shaft 420 and the flange 422) and part of the stator (the sleeve 480 and the plate 490). The sleeve 480 and the plate 490 constitute a bearing unit that rotatably supports the rotor.

A pair of herringbone-shaped radial dynamic pressure grooves 482 that are vertically separated from each other are formed on the inner surface of the sleeve 480. A first herringbone-shaped thrust dynamic pressure groove 424 is formed on the upper surface of the flange 422. A second herringbone-shaped thrust dynamic pressure groove 426 is formed on the lower surface of the flange 422. The rotor is axially and radially supported by the dynamic pressure generated in the lubricant 492 by these dynamic pressure grooves when the brushless motor 400 rotates.

A capillary seal 494, where the gap between the inner surface of the sleeve 480 and the outer surface of the shaft 420 increases gradually upwardly, is formed on the opening side of the sleeve 480. The capillary seal 494 prevents the leakage of the lubricant 492 with the capillary effect.

The laminated core 460 has a ring portion and twelve teeth that extend out radially from the ring portion. The laminated core 460 is formed by laminating eight thin electro-magnetic steel plates and integrating them by laser welding. Each of the coils 470 is wound around one of the twelve teeth, respectively. A driving flux is generated along the teeth by applying an M-phase (M is a natural number) sinusoidal driving current through the coils 470. The inner surface of the ring portion of the laminated core 460 is fitted to the outer surface of the cylindrical portion 452 with clearance fit, and glued there.

The torque-ripple and the resonance frequency in the above-mentioned brushless motor 400 are explained below. It is assumed here that two magnetic recording disks 810 are mounted on the brushless motor 400.

First, with regard to the torque-ripple, in the brushless motor 400, the interaction between the magnetic field induced in the coils 470 and the magnetic poles of the cylindrical magnet 440 generates a driving torque. There is torque-ripple in this driving torque. The frequency (hereinafter referred to as a torque-ripple center frequency) of the basic wave of the torque-ripple is proportional to the rotational frequency N (Hz) of the brushless motor 400 and is described in the following Equation 1.

$$M*P*N(\text{Hz}) \tag{Equation 1}$$

In reality, the interaction is not even in the sense that the driving torque applied to the rotor is not even during one rotation of the rotor. Therefore, the torque-ripple is modulated with the same frequency as the rotational frequency N (Hz). As a result, the torque-ripple includes frequency sideband components as shown in the following Equation 2.

$$M*P*N\pm N=(M*P\pm 1)*N(\text{Hz}) \tag{Equation 2}$$

Hereinafter the torque-ripple center frequency M*P*N and its two sideband components (M*P±1)*N are considered. These three frequencies are denoted as torque-ripple frequencies.

Second, the resonance is investigated. The inventors of the present invention investigate the resonance of the brushless motor 400 when not rotating in the situation where two magnetic recording disks 810, both with a 3.5-inch (88.9 mm) diameter, are mounted on the brushless motor 400.

Above is an explanation based on the exemplary embodiment(s). These embodiments are intended to be illustrative only, and it will be obvious to those skilled in the art that various modifications to constituting elements and processes could be developed and that such modifications are also within the scope of the present invention.

The second embodiment of the present invention describes the case where the radial concave portion 112 is formed on the hub 110. However, the present invention is not limited to this. In particular, the brushless motor may be configured so that it satisfies Equation 4 even if it does not have the radial concave portion 112.

The first, second, and third embodiments of the present invention describe the so-called outer-rotor type of the brushless motor in which the magnet is located outside of the laminated core. However, the present invention is not limited to this. For example, the so-called inner-rotor type of the brushless motor in which the magnet is located inside of the laminated core may also be configured so that it satisfies Equation 3 or Equation 4.

The first, second, and third embodiments of the present invention describe the case where the sleeve is fixed to the base plate and the shaft rotates with respect to the sleeve. However, the present invention is not limited to this. For example, a shaft-fixed type of the brushless motor in which the shaft is fixed to the base plate and the sleeve and the hub rotate together with respect to the shaft can be implemented.

The embodiment of the present invention describes the case where the laminated core is used. However, the present invention is not limited to this. The core does not have to be a laminated core.

While the preferred embodiments of the present invention have been described using specific terms, such description is for illustrative purposes only, and it is to be understood that changes and variations may be made without departing from the spirit or scope of the appended claims.

The first embodiment of the present invention describes the case where two magnetic recording disks 810 are mounted on the brushless motor. However, the present invention is not limited to this. For example, two magnetic recording disks made of aluminum alloy may be mounted. Each of the two disks may have a thickness greater than or equal to 1.2 mm. In particular, the thickness may be set to be 1.27 mm. It is preferred that a magnetic recording disk made of aluminum alloy with the thickness greater than or equal to 1.5 mm per disk, in particular, a 1.75 mm thickness, is mounted since the stiffness increases and since it is less likely to be affected by vibrations.

What is claimed is:

1. A disk drive device, comprising:
   a hub on which a recording disk is to be mounted;
   a base rotatably supporting the hub through a bearing unit;
   a core fixed to the base, the core having a ring portion and a plurality of teeth that extend radially from the ring portion;
   coils wound around the plurality of teeth, the coils being three-phase driven; and
   a magnet fixed to the hub, the magnet being magnetized for driving with P (P is a natural number) poles along the circumferential direction and arranged to radially face the plurality of teeth,
   wherein the hub has a convex portion of which the center is a rotational axis, and the convex portion is fit into the central hole of the recording disk, and
   wherein the rotational frequency N (Hz) of the hub satisfies $$N<F_0/(3*P+2),$$

where $F_0$ (Hz) is an Eigen frequency of the second order rocking-mode resonance when not rotating in the situation where the recording disk is mounted on the hub.

2. A disk drive device according to claim 1, wherein the surface of the hub on which the recording disk hits is formed to be flat by cutting.

3. A disk drive device according to claim 2, wherein the surface of the hub on which the recording disk hits is cut in the radial direction from outside to inside and beyond the surface of the convex portion where the central hole of the recording disk fits.

4. A disk drive device according to claim 1, wherein at least two recording disks are to be mounted on the hub.

5. A disk drive device according to claim 1, wherein a recording disk with the thickness greater than or equal to 1.2 mm is to be mounted on the hub.

6. A disk drive device according to claim 1, wherein a recording disk with the thickness greater than or equal to 1.5 mm is to be mounted on the hub.

7. A disk drive device according to claim 1, wherein a ring-shaped radial concave portion that caves radially is formed on the surface of the convex portion where the central hole of the recording disk fits.

8. A disk drive device according to claim 7, wherein the depth in the radial direction of the radial convex portion is between 0.1 mm and 0.3 mm.

9. A disk drive device according to claim 7, wherein the length in the axial direction of the radial convex portion is between 0.3 mm and 1 mm.

10. A disk drive device according to claim 1, wherein two radial dynamic pressure grooves, which are separated from each other in the axial direction, are formed on the bearing unit, and the surface of the hub on which the recording disk hits is formed so that it is located between the two radial dynamic pressure grooves in the axial direction.

11. A disk drive device, comprising:
a hub on which a recording disk is to be mounted;
a base rotatably supporting the hub through a bearing unit;
a core fixed to the base, the core having a ring portion and a plurality of teeth that extend radially from the ring portion;
coils wound around the plurality of teeth, the coils being three-phase driven; and
a magnet fixed to the hub, the magnet being magnetized for driving with P (P is a natural number) poles along the circumferential direction and arranged to radially face the plurality of teeth,
wherein the hub has a convex portion of which the center is a rotational axis, and the convex portion is fit into the central hole of the recording disk, and
wherein an Eigen frequency $F_0$ satisfies $$F_0 > N*(3*P+2),$$

where $F_0$ (Hz) is an Eigen frequency of the second order rocking-mode resonance when not rotating in the situation where the recording disk is mounted on the hub, and N (Hz) is the rotational frequency of the hub.

12. A disk drive device according to claim 11, wherein the surface of the hub on which the recording disk hits is formed to be flat by cutting.

13. A disk drive device according to claim 12, wherein the surface of the hub on which the recording disk hits is cut in the radial direction from outside to inside and beyond the surface of the convex portion where the central hole of the recording disk fits.

14. A disk drive device according to claim 11, wherein at least two recording disks are to be mounted on the hub.

15. A disk drive device according to claim 11, wherein a recording disk with the thickness greater than or equal to 1.2 mm is to be mounted on the hub.

16. A disk drive device according to claim 11, wherein a recording disk with the thickness greater than or equal to 1.5 mm is to be mounted on the hub.

17. A disk drive device according to claim 11, wherein a ring-shaped radial concave portion that caves radially is formed on the surface of the convex portion where the central hole of the recording disk fits.

18. A disk drive device according to claim 17, wherein the depth in the radial direction of the radial convex portion is between 0.1 mm and 0.3 mm.

19. A disk drive device according to claim 17, wherein the length in the axial direction of the radial convex portion is between 0.3 mm and 1 mm.

20. A disk drive device according to claim 11, wherein two radial dynamic pressure grooves, which are separated from each other in the axial direction, are formed on the bearing unit and the surface of the hub on which the recording disk hits is formed so that it is located between the two radial dynamic pressure grooves in the axial direction.

* * * * *